United States Patent [19]

Kaneda et al.

[11] Patent Number: 5,374,113
[45] Date of Patent: Dec. 20, 1994

[54] ANTI-SKID BRAKE CONTROL SYSTEM

[75] Inventors: Ichiro Kaneda; Yukio Sudo, both of Atsugi, Japan

[73] Assignees: Unisia Jecs Corporation; Nissan Motor Co., Lt.D, both of Japan

[21] Appl. No.: 68,673

[22] Filed: May 28, 1993

[30] Foreign Application Priority Data

May 29, 1992 [JP] Japan .................. 4-036380[U]

[51] Int. Cl.⁵ .............................. B60T 15/46
[52] U.S. Cl. ..................... 303/116.2; 303/84.1
[58] Field of Search ............... 303/9.62, 9.75, 113.5, 303/116.2, 84.1, 84.2; 137/493.3, 493.9

[56] References Cited

U.S. PATENT DOCUMENTS

| 4,453,782 | 6/1984 | Arikaws et al. | 303/116 |
| 4,790,414 | 12/1988 | Harrison | 303/84.1 |
| 4,941,712 | 7/1990 | Hirobe | 303/114 |
| 5,002,345 | 3/1991 | Becker | 303/115 |
| 5,205,618 | 4/1993 | Sudo | 303/84.1 |

FOREIGN PATENT DOCUMENTS

| 56-82650 | 7/1981 | Japan . |
| 61-16657 | 5/1985 | Japan . |
| 2218479A | 8/1989 | United Kingdom . |

Primary Examiner—Andres Kashnikow
Assistant Examiner—Lee W. Young
Attorney, Agent, or Firm—Lowe, Price, LeBlanc & Becker

[57] ABSTRACT

A brake-fluid reflux type anti-skid brake control system for an automotive vehicle, comprises a main brake-fluid line fluidly disposed between a master cylinder and a wheel cylinder for supplying a brake fluid from the master cylinder to the wheel cylinder during usual braking, a brake-fluid reflux line arranged in parallel with the main line for returning the brake fluid from the wheel cylinder to the master cylinder side during operation of the system, directional control valves arranged for controlling the respective fluid flow in the main brake-fluid line and in the reflux line, depending upon a skidding condition of a vehicle wheel, and a plunger type control valve arranged between the outlet port of the master cylinder and an upstream junction of the main line and the reflux line. The control valve is responsive to a fluid pressure representing whether the anti-skid brake control system is in an operative state or in an inoperative state, in a manner so as to provide a constricted brake-fluid flow therethrough to the wheel cylinder in the operative state of the system and to provide a full brake-fluid flow therethrough to the wheel cylinder in the inoperative state of the system.

2 Claims, 8 Drawing Sheets

ANTI-SKID BRAKE CONTROL SYSTEM

BACKGROUND OF THE INVENTION

1. Field of the Invention

The present invention relates to an automotive anti-skid brake control system generally abbreviated as an "ABS", and specifically to a brake-fluid reflux type anti-skid brake control system which can provide a wheel-cylinder pressure moderately intensifying characteristic at an ABS pressure intensifying mode at which the wheel-cylinder pressure is intensified during operation of the ABS. Such a wheel-cylinder pressure moderately intensifying characteristic will be hereinafter referred to as an "ABS moderate pressure intensifying characteristic".

2. Description of the Prior Art

Recently, there have been proposed and developed various anti-skid brake control systems for preventing brakes from locking road wheels during quick braking or during braking on a low frictional road surface so as to prevent skidding. In large luxury cars and high grade vehicles, the ABS is often assembled to provide maximum effective braking, and consequently to decrease a braking distance and to enhance a directional stability of the vehicle, irrespective of the road condition. The ABS permits normal application of the brakes by alternately holding, reducing, holding, and intensifying the wheel-cylinder pressure, such that braking can be held to just below the point at which a skid would start to develop.

As is generally known, the ABS comes into operation if an electronic control unit detects that the vehicle wheel is locked during quick braking or during braking on a low frictional road surface. At the beginning of the anti-skid brake control, the ABS operates at a wheel-cylinder pressure reducing mode which will be referred to as an "ABS pressure reducing mode". In the ABS pressure reducing mode, the brake fluid in the wheel cylinder is temporarily stored in a brake fluid reservoir through a directional control valve arranged in a brake fluid reflux line. Thereafter, a fluid-pressure pump is driven in order to reflux the brake fluid in the reservoir to a hydraulic pressure supply line connected to the outlet port of the master cylinder, with the result that the wheel-cylinder pressure is gradually reduced. Since the above fluid pressure pump is driven only during operation of the ABS, the fluid pump is generally referred to as an "ABS pump". As set forth above, the wheel-cylinder pressure is reduced in accordance with the ABS pressure reducing mode. Thereafter, when the control unit detects the road wheel has been unlocked during operation of the ABS, a brake fluid introduced from the master cylinder side and a brake fluid discharged from the ABS pump and refluxed just downstream of the outlet port of the master cylinder are both fed through a directional control valve serving as a pressure intensifying valve to the wheel cylinder. Thus, the wheel-cylinder pressure is intensified again. In this manner, the wheel-cylinder pressure is suitably adjusted by the ABS, so as to effectively prevent an undesirable wheel-lock during quick braking or during braking on a low frictional road surface, while providing a reasonably high braking force.

In the prior art ABS not including an ABS moderate pressure intensifying characteristic, after the wheel-cylinder pressure control mode is changed from the ABS pressure reducing mode to the ABS pressure intensifying mode, there is a tendency for the brake fluids output from the master cylinder and the ABS pump to be rapidly fed into the wheel cylinder. Thus, there is a possibility that the wheel is locked again, due to an excessive pressure-rise. In order to solve such a problem, a more recent anti-skid brake control system employs a brake-fluid flow control valve which is arranged in the brake-fluid supply line between the master cylinder and the wheel cylinder for assuring ABS a moderate pressure intensifying characteristics at an ABS pressure intensifying mode. Such ABS with a moderate pressure intensifying characteristics has been disclosed in Japanese Patent Second Publication No. 61-16657 (corresponding to U.S. Pat. No. 4,453,782) and Japanese Patent First Publication No. 56-82650 (corresponding to German Patent Application No. P 29 45 444.2). Such a more recent ABS employing the above brake fluid flow control valve with the ABS moderate pressure intensifying characteristic is shown in FIG. 8.

Referring now to FIG. 8, the conventional anti-skid brake control system includes a hydraulic brake circuit (corresponding to the right-half of FIG. 8) of a front wheel side for independently controlling front-right and front-left brakes and a hydraulic brake circuit (corresponding to the left-half of FIG. 8) of a rear wheel side for commonly controlling rear-right and rear-left brakes. Since the basic construction of the front-wheel-side hydraulic brake circuit is similar to that of the rear-wheel-side hydraulic brake circuit, only the rear-wheel-side brake circuit will be hereinafter described in detail for the purpose of simplification of description. In FIG. 8, the same reference numerals used in the front-wheel-side brake circuit will be applied to the corresponding elements used in the rear-wheel-side brake circuit. The conventional anti-skid brake control system includes a main brake-fluid supply line A arranged for supplying brake fluid from a master cylinder 1 to a wheel cylinder 2 during usual braking, and a brake-fluid reflux line B arranged in parallel to the supply line A for returning the brake fluid from the wheel cylinder 2 just downstream of the outlet port of the master cylinder 1. The conventional ABS includes a first electromagnetic directional control valve 3 arranged in the supply line A and mainly serving as a pressure intensifying valve, and a second electromagnetic directional control valve 4 arranged in the reflux line B and mainly serving as a pressure reducing valve. The ABS also includes a brake-fluid reservoir 5 and an ABS pump 6 in the reflux line B. With the above arrangement, the brake fluid in the wheel cylinder 2 is temporarily stored in the reservoir 5 by means of the ABS pump 6 having a driven connection with an electric motor M at the ABS pressure reducing mode and thereafter the brake fluid stored in the reservoir 5 returns just downstream of the outlet port of the master cylinder through rotation of the ABS pump at the ABS pressure intensifying mode. As clearly shown in FIG. 8, the first directional control valve 3 has a fixed orifice 7 so as to assure the ABS moderate pressure intensifying characteristics in the ABS pressure intensifying mode. The ABS operates to provide a maximum effective braking by alternately holding, reducing, holding, and intensifying the wheel-cylinder pressure if an electronic control unit (not shown) detects that the road wheel is locked during quick braking or during braking on a low frictional road surface. As seen in FIG. 8, since the normally open directional control valve 3 is opened and the normally closed directional control valve 4 is closed during usual braking, the orifice 7 provides a suitably restricted fluid flow through an orifice constriction even during usual braking. As a result, a braking response is deteriorated during usual braking due to the above orifice constriction. It is difficult to design a predetermined restricted fluid flow rate of a fixed orifice assuring a desired ABS moderate pressure intensifying characteristics, without deteriorating the braking responsiveness during usual braking.

SUMMARY OF THE INVENTION

It is, therefore in view of the above disadvantages a principal object of the present invention to provide an improved brake-fluid reflux type anti-skid brake control system with an ABS moderate pressure intensifying characteristics which can provide an ABS moderate pressure intensifying characteristics during operation of the ABS and assure a high braking response during usual braking.

In order to accomplish the aforementioned and other objects of the invention, an anti-skid brake control system for an automotive vehicle, comprises a main brake-fluid line fluidly disposed between a master cylinder and a wheel cylinder, for supplying a brake fluid from the master cylinder to the wheel cylinder, during usual braking, a brake-fluid reflux line arranged in parallel with said main brake-fluid line, for returning the brake fluid in the wheel cylinder to the master cylinder side, during operation of the system, a directional control valve means arranged for directionally controlling a fluid flow in said main brake-fluid line and a fluid flow in said reflux line, depending upon a skidding condition of a vehicle wheel, a fluid-pressure operated fluid flow control means arranged between the outlet port of the master cylinder and an upstream junction of said main brake-fluid line and said reflux line and responsive to a fluid pressure representing whether the anti-skid brake control system is in an operative state or in an inoperative state, in a manner so as to provide a constricted brake-fluid flow therethrough to the wheel cylinder in the operative state of the system and to provide a full brake-fluid flow therethrough to the wheel cylinder in the inoperative state of the system.

According to another aspect of the invention, an anti-skid brake control system for an automotive vehicle, comprises a main brake-fluid line fluidly disposed between a master cylinder and a wheel cylinder, for supplying a brake fluid from the master cylinder to the wheel cylinder, during usual braking, a brake-fluid reflux line arranged in parallel with said main brake-fluid line, for returning the brake fluid in the wheel cylinder to the master cylinder side, during operation of the system, a directional control valve means arranged for directionally controlling a fluid flow in said main brake-fluid line and a fluid flow in said reflux line, depending upon a skidding condition of a vehicle wheel, a fluid-pressure operated control valve means arranged between the outlet port of the master cylinder and an upstream junction of said main brake-fluid line and said reflux line, and including a main fluid passage providing a full brake-fluid flow from the master cylinder through said fluid-pressure operated control valve means to the wheel cylinder and an orifice passage providing a constricted fluid flow from the master cylinder through said fluid-pressure operated control valve means to the wheel cylinder, and said fluid-pressure operated control valve means being responsive to a fluid pressure in said reflux line, to fully close said main fluid passage and to open said orifice passage when the fluid pressure in said reflux line exceeds a predetermined threshold value during operation of the system.

According to a further aspect of the invention, an anti-skid brake control system for an automotive vehicle, comprises a main brake-fluid line fluidly disposed between a master cylinder and a wheel cylinder, for supplying a brake fluid from the master cylinder to the wheel cylinder, during usual braking, a brake-fluid reflux line arranged in parallel with said main brake-fluid line, for returning the brake fluid in the wheel cylinder to the master cylinder side, during operation of the system, a directional control valve means arranged for directionally controlling a fluid flow in said main brake-fluid line and a fluid flow in said reflux line, depending upon a skidding condition of a vehicle wheel, a fluid-pressure operated plunger valve arranged between the outlet port of the master cylinder and an upstream junction of said main brake-fluid line and said reflux line, and including a main fluid passage providing a full brake-fluid flow from the master cylinder therethrough to the wheel cylinder and an orifice passage providing a constricted fluid flow from the master cylinder therethrough to the wheel cylinder, and said plunger valve enclosing therein an axially slidable plunger responsive to the fluid pressure in said reflux line to be movable between a first valve position providing said full fluid flow and a second valve position providing said constricted fluid flow, and said plunger being held in the second valve position only when the fluid pressure in said reflux line exceeds said predetermined threshold value. The main fluid passage is defined in said plunger to establish a full fluid communication between the master cylinder and the wheel cylinder when said plunger is kept in said first valve position, while said orifice passage is defined in said plunger to establish a constricted fluid communication between the master cylinder and the wheel cylinder when said plunger is kept in said second valve position. The orifice passage is comprised of a fixed orifice creating said constricted fluid flow and an one-way check valve permitting a brake-fluid flow from the master cylinder to the wheel cylinder. The plunger includes a circumferential land substantially midway thereof, so as to define an annular orifice in cooperation with the inner peripheral surface of a cylindrical hollow defined in a valve housing of said plunger valve, for suppressing kick-back occurring due to the fluid flow from said reflux line through said upstream junction and said main fluid passage to the master cylinder, during operation of the system.

According to a still further aspect of the invention, an anti-skid brake control system for an automotive vehicle, comprises a main brake-fluid line fluidly disposed between a master cylinder and a wheel cylinder, for supplying a brake fluid from the master cylinder to the wheel cylinder, during usual braking, a brake-fluid reflux line arranged in parallel with said main brake-fluid line, for returning the brake fluid in the wheel cylinder to the master cylinder side, during operation of the system, a directional control valve means arranged for directionally controlling a fluid flow in said main brake-fluid line and a fluid flow in said reflux line, depending upon a skidding condition of a vehicle wheel, a fluid-pressure operated fluid flow control means arranged between the outlet port of the master cylinder and an upstream junction of said main brake-fluid line and said reflux line, and said fluid flow control means including a fluid flow constricting means providing a constricted fluid flow to the wheel cylinder therethrough when the master-cylinder pressure exceeds a predetermined threshold value and the master-cylinder pressure becomes slightly greater than the fluid pressure in said upstream junction from a balanced state wherein the master-cylinder pressure and the fluid pressure in the upstream junction are balanced to each other, and means for keeping said fluid flow constricting means in an inoperative state and for establishing a full fluid communication between the master cylinder and the wheel cylinder, when the master-cylinder pressure is equal to or lower than said predetermined threshold value. The fluid flow control means comprises a plunger valve having a valve housing, a first plunger defining a first pressure chamber leading to the master cylinder and an atmospheric air chamber introducing atmosphere thereinto and a second plunger defining a second pressure chamber storing a brake fluid. The fluid flow constricting means includes said second plunger responsive to the pressure difference between the master-cylinder pressure and the fluid pressure in said upstream junction, a second return spring acting to hold said second plunger in its spring set position when the master-cylinder pressure is balanced to the fluid pressure in said upstream junction, and a fixed orifice formed in said second plunger for assuring a constricted brake-fluid flow out of said second pressure chamber during operation of the system. The keeping means is comprised of said first plunger responsive to the master-cylinder pressure and a first return spring acting to hold said first plunger in its spring set position when the master-cylinder pressure is equal to or lower than the predetermined threshold value.

According to another aspect of the invention, an anti-skid brake control system for an automotive vehicle, comprises a main brake-fluid line fluidly disposed between a master cylinder and a wheel cylinder, for supplying a brake fluid from the master cylinder to the wheel cylinder, during usual braking, a brake-fluid reflux line arranged in parallel with said main brake-fluid line, for returning the brake fluid in the wheel cylinder to the master cylinder side, during operation of the system, a directional control valve means arranged for directionally controlling a fluid flow in said main brake-fluid line and a fluid flow in said reflux line, depending upon a skidding condition of a vehicle wheel, a fluid-pressure operated fluid flow control means arranged between the outlet port of the master cylinder and an upstream junction of said main brake-fluid line and said reflux line, and said fluid flow control means including a fluid flow constricting means providing a constricted fluid flow to the wheel cylinder therethrough when the pressure difference between the master-cylinder pressure and the wheel-cylinder pressure exceeds a predetermined threshold value and the master-cylinder pressure becomes slightly greater than the fluid pressure in said upstream junction from a balanced state wherein the master-cylinder pressure and the fluid pressure in the upstream junction are balanced to each other, and means for keeping said fluid flow constricting means in an inoperative state and for establishing a full fluid communication between the master cylinder and the wheel cylinder, when the pressure difference between the master-cylinder pressure and the wheel-cylinder pressure is equal to or lower than said predetermined threshold value. The fluid flow control means comprises a plunger valve having a valve housing, a first plunger defining a first pressure chamber leading to the master cylinder and a pilot pressure chamber introducing the wheel-cylinder pressure thereinto and a second plunger defining a second pressure chamber storing a brake fluid. The fluid flow constricting means includes said second plunger responsive to the pressure difference between the master-cylinder pressure and the fluid pressure in said upstream junction, a second return spring acting to hold said second plunger in its spring set position when the master-cylinder pressure is balanced to the fluid pressure in said upstream junction, and a fixed orifice formed in said second plunger for assuring a constricted brake-fluid flow out of said second pressure chamber during operation of the system. The keeping means includes said first plunger responsive to the pressure difference between the master-cylinder pressure and the wheel-cylinder pressure and a first return spring acting to hold said first plunger in its spring set position when the pressure difference between the master-cylinder pressure and the wheel-cylinder pressure is equal to or lower than the predetermined threshold value. In case of the above construction, since the brake fluid is supplied to the wheel cylinder from the pilot pressure chamber as well as from the main brake-fluid line, a more superior braking response can be assured.

DESCRIPTION OF THE PREFERRED EMBODIMENTS

First embodiment

Figure 2:
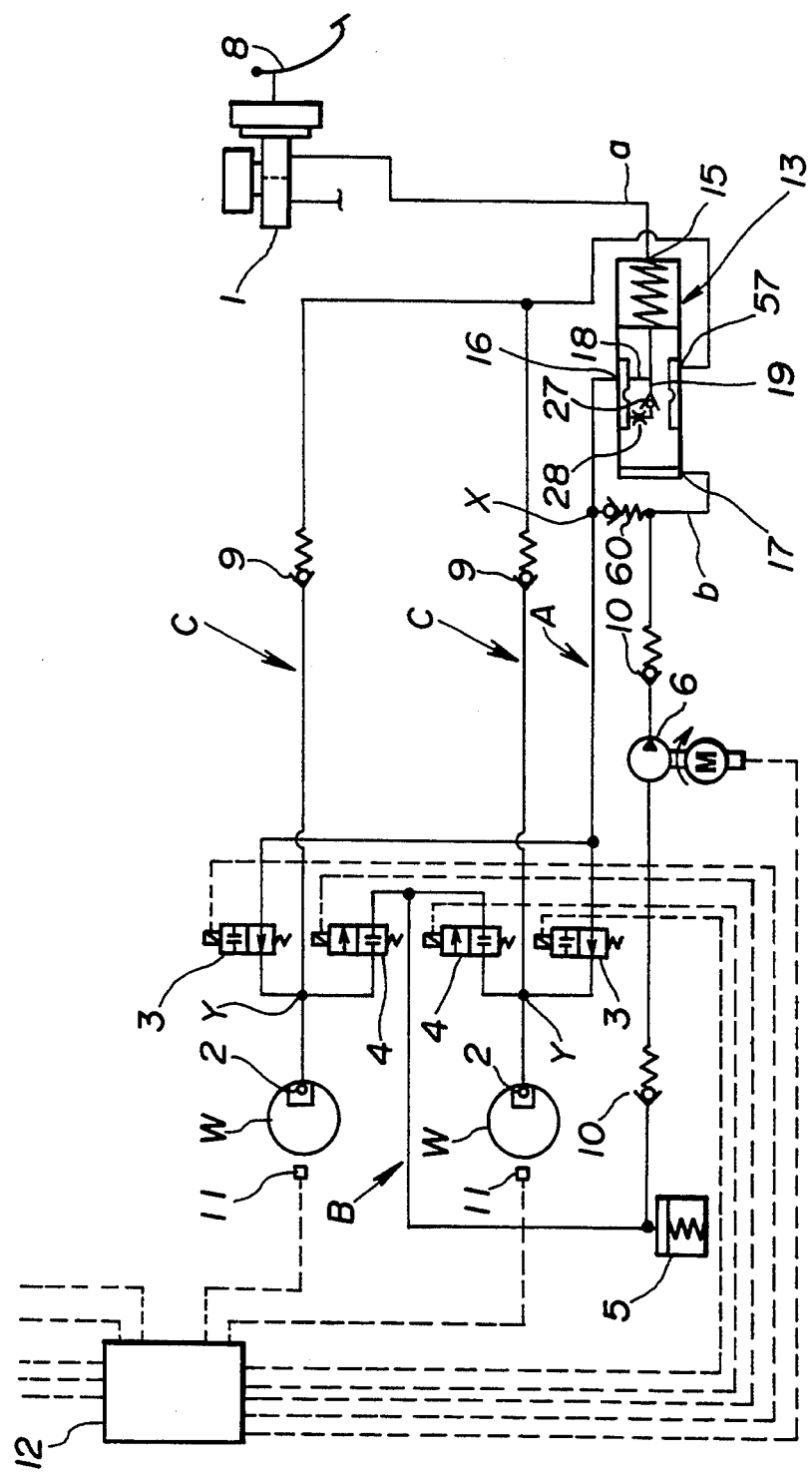
FIG. 2 is a circuit diagram illustrating a front-wheel-side hydraulic brake circuit including the control valve of the first embodiment.
Figure 3:
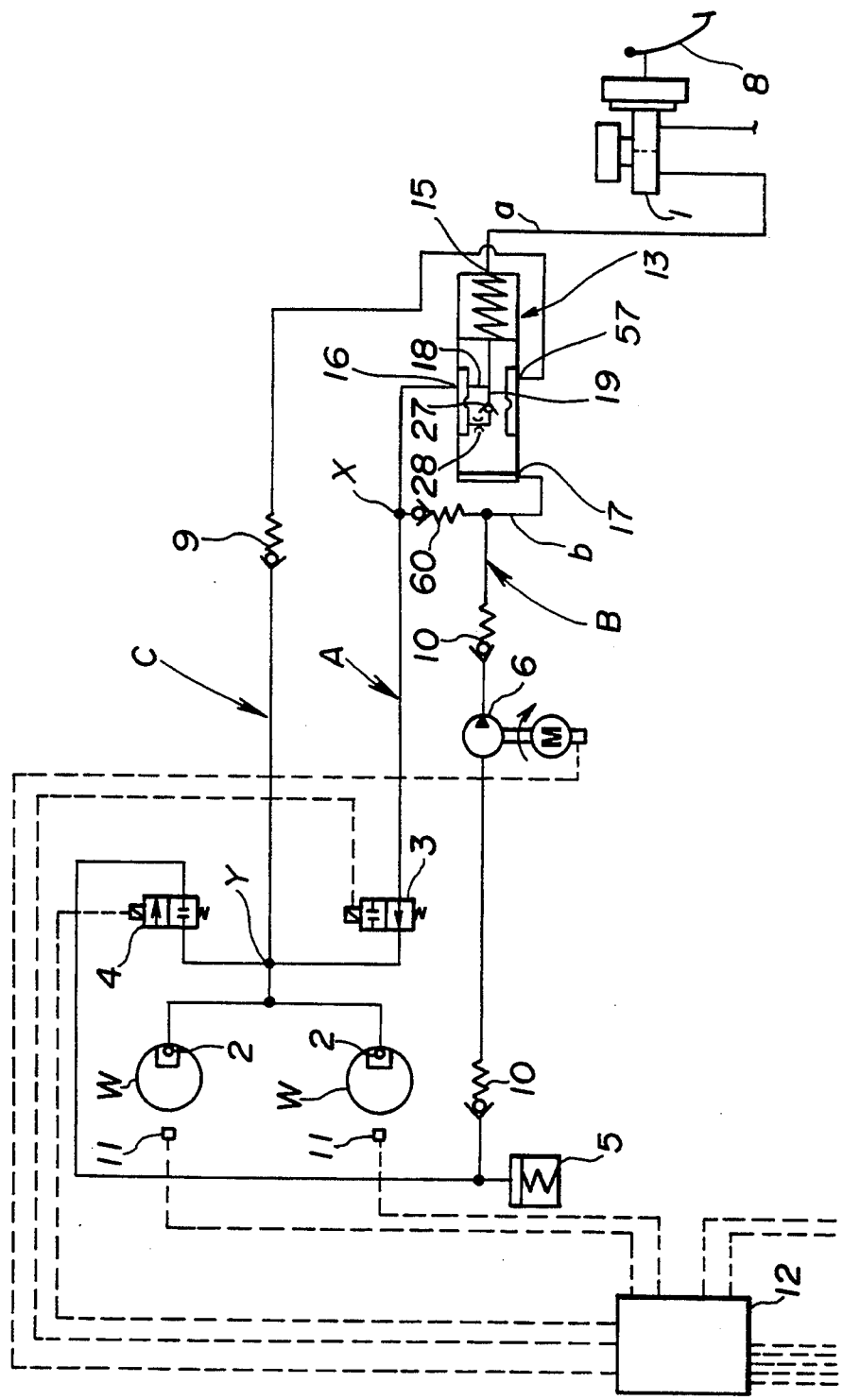
FIG. 3 is a circuit diagram illustrating a rear-wheel-side hydraulic brake circuit including the control valve of the first embodiment.

Referring now to the drawings, particularly to FIGS. 2 and 3, there is shown an anti-skid brake control system for an automotive vehicle having a front-wheel-side brake circuit for two front wheels W and a rear-wheel-side brake circuit for two rear wheels W. Since the construction of the front-wheel-side brake circuit is similar to that of the rear-wheel-side brake circuit, only the rear-wheel-side brake circuit is hereinbelow explained in detail, for the purpose of simplification of description. The same reference numerals used in the prior art ABS are applied to the corresponding elements used in the embodiments for the purpose of comparison between the preferred embodiments and the prior art.

Referring now to FIG. 3, the ABS of the first embodiment comprises a main brake-fluid line A arranged for supplying the brake fluid from a master cylinder 1 to a wheel cylinder 2 during usual braking, and a brake-fluid reflux line B arranged in parallel with the brake-fluid supply line A for returning the brake fluid in the wheel cylinder 2 to the master cylinder side during an anti-skid brake control, and a by-pass line C arranged in parallel with the supply line A between the master cylinder 1 and the wheel cylinder 2, for by-passing and returning the brake fluid from the wheel cylinder 2 to the master cylinder 1 in cooperation with the supply line A, as soon as the depression on the brake pedal 8 is released. Two directional control valves 3 and 4 are arranged in the vicinity of a downstream junction Y between the downstream end of the supply line A and the upstream end of the reflux line B. Each directional control valve 3 and 4 is comprised of an electromagnetic shut-off valve.

In more detail, the normally open type shut-off valve 3 serving as an inflow valve is arranged in the supply line A, while the normally closed type shut-off valve 4 serving as an outflow valve is arranged in the reflux line B. Fluidly disposed in the by-pass line C is a check valve 9 for permitting the fluid flow from the downstream junction Y towards the master cylinder side and prevent a back-flow towards the junction Y. Fluidly disposed in the reflux line B are a brake-fluid reservoir 5 temporarily storing the brake fluid fed from the wheel cylinder 2 and an ABS pump 6 having a driven connection with an electric motor M to generate the pressurized brake-fluid flow towards an upstream junction X between the upstream end of the supply line A and the downstream end of the reflux line B during operation of the ABS. A pair of check valves 10 are respectively arranged in the vicinity of the inlet port and the outlet port of the ABS pump 6. Vehicle speed sensors 11 are provided to detect vehicle wheel speeds of all of the vehicle wheels, respectively. Reference numeral 12 designates an electronic control unit connected to the respective sensors 11 for determining a skidding condition of each of the wheels on the basis of the wheel speed indicative signals from the sensors 11 and for outputting control signals to the valves 3 and 4, and the ABS pump 6. A check valve 60 is arranged in a line in the vicinity of the upstream junction X for permitting the brake-fluid flow from the downstream end of the reflux line B to the upstream end of the supply line A and for preventing a back-flow from the upstream end of the supply line A to the downstream end of the reflux line B. Note that the ABS of the first embodiment includes a plunger type control valve 13 as hereinafter described in detail. As seen in FIG. 3, the control valve 13 is fluidly disposed in a first connecting line a through which the junction X is connected to the outlet port of the master cylinder 1. Reference numeral b designates a second connecting line communicating the downstream end of the reflux line B with a reflux port 17 hereinbelow described in detail.

Figure 1A:
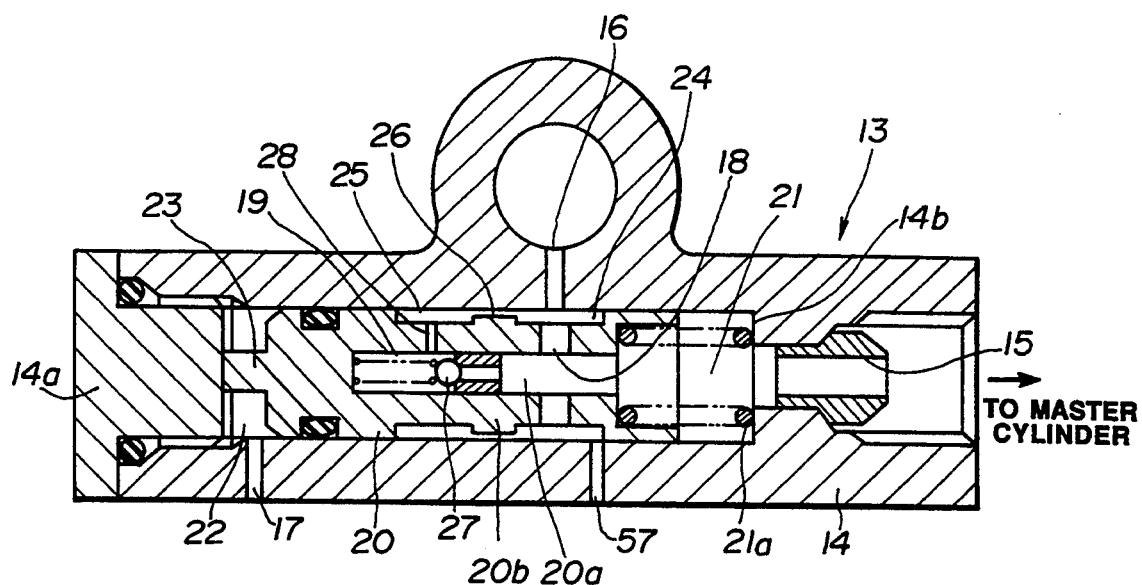
FIGS. 1A and 1B are a longitudinal cross-sectional view illustrating a control valve employed in a first embodiment of an anti-skid brake control system according to the invention.
Figure 1B:
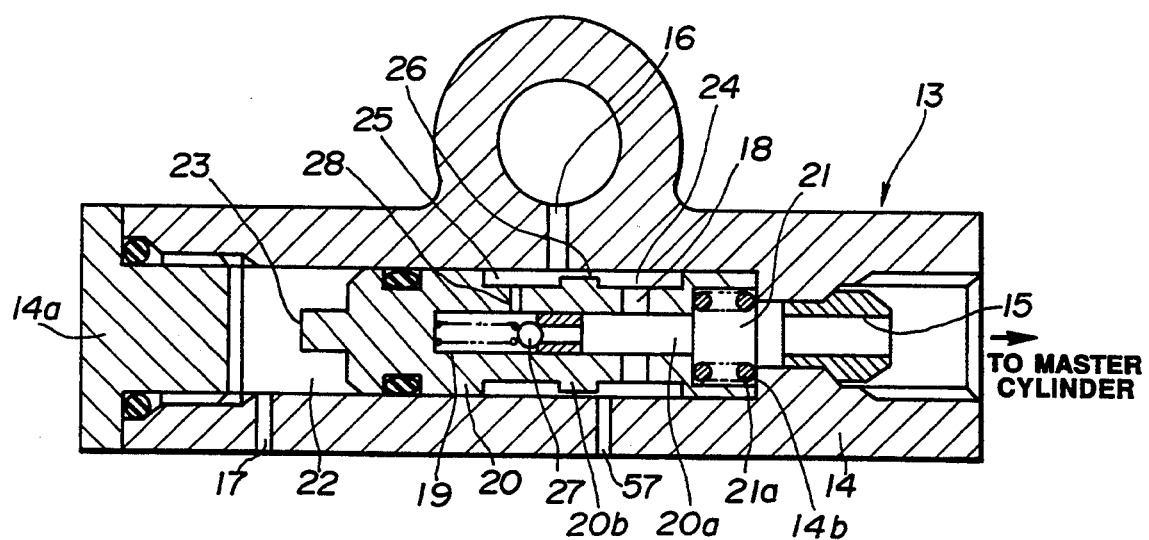

Referring to FIGS. 1A and 1B, the control valve 13 comprises a valve housing 14 defining an axially extending cylindrical hollow therein and a plug 14a attached to one end of the housing 14 for hermetically sealing one end of the hollow in a fluid-tight fashion. The other end of the hollow is connected through a master-cylinder side port 15 via the first connecting line a to the outlet port of the master cylinder 1. In addition to the port 15, the housing 14 includes a wheel-cylinder side port 16 communicating the control valve 13 and the supply line A, the reflux port 17 connecting to the upstream end of the reflux line B for introducing the fluid pressure in the reflux line B as a pilot pressure, and a by-pass port 57 arranged for introducing the brake-fluid from the by-pass line C. Slidably disposed in the cylindrical hollow of the housing 14 is a plunger 20 having a radially extending main fluid passage 18 and an orifice passage 19. The respective fluid passages 18 and 19 are communicated through an axially extending common fluid passage 20a to the master-cylinder side port 15. The valve 13 is designed to assure a restricted fluid flow from the master-cylinder side to the wheel-cylinder side depending on a relative position of the plunger 20 to the housing 14. The housing 14, the plug 14a, and the plunger 20 are cooperate cooperated with each other to define a pair of pressure chambers 21 and 22 at both ends of the plunger 20. The pressure chamber 21 is connected through the master-cylinder side port 15 to the outlet port of the master cylinder 1. A return spring 21a is operably disposed in the chamber 21 to normally bias the plunger 20 in an axial rightward direction (viewing FIGS. 1A and 1B). A maximum leftward movement of the plunger 20 is restricted by abutment between the rightmost end surface of the plug 14a and an axially extending stopper 23 formed integral with the plunger 20, while a maximum rightward movement of the plunger 20 is restricted by abutment between the substantially annular rightmost end of the plunger 20 and a shoulder 14b serving as a spring seat for the spring 21a.

The fluid pressure in the reflux line B is introduced through the reflux port 17 to the pressure chamber 22. The plunger 20 also includes a pair of annular grooves 24 and 25 defined at both sides of a substantially central land 20b. The central land 20b has a diameter slightly smaller than both ends of the plunger 20, so as to define an essentially annular fixed orifice 26. The main fluid passage 18 exposes the annular groove 24. The annular groove 24 is always communicated with the by-pass port 57, irrespective of the relative position of the plunger 20 to the housing 14. The other annular groove 25 is communicated with the orifice passage 19. As clearly shown in FIGS. 1A and 1B, fluidly disposed in the orifice passage 19 are a fixed orifice 28 which has a predetermined area of fluid flow for assuring a designated restricted fluid flow to the wheel-cylinder, and an one-way check valve 27 blocking the fluid flow from the groove 25 therethrough to the master-cylinder side port 15 and permitting the fluid flow in the opposite direction. With the above constructions, the ABS of the first embodiment operates as explained below.

(1) Usual braking:

During usual braking, since the ABS is deactivated and as a result the ABS pump 6 is inoperative, with the result that the fluid pressure in the reflux line B is held below a predetermined threshold value. Thus, the plunger 20 takes the spring set position as illustrated in FIG. 1A under the biasing force caused by the spring 21a. In the previously noted leftmost position of the plunger 20, established is a full fluid communication between the master-cylinder side port 15 and the wheel-cylinder side port 16 via the main fluid passage 18. Under these conditions, when the brake-pedal 8 is depressed, the master-cylinder pressure is smoothly transmitted from the outlet port of the master cylinder 1, through the first connecting line a, the master-cylinder side port 15, the common fluid passage 20a, the main fluid passage 18, the circumferential groove 24 and the wheel-cylinder side port 16 to the wheel cylinder 2, in that order. As will be appreciated from the above, such a full fluid communication results in a high braking response during usual braking.

(2) Anti-skid control:

In this system, the front-left wheel, front-right wheel, and a pair of rear wheels are subject to an anti-skid control, independently of each other. Since the manner of the anti-skid control is common only the anti-skid control on the rear wheels will be explained below in detail.

Under the depressed condition of the brake-pedal 8, an anti-skid brake control consisting of an ABS pressure reducing mode, an ABS pressure holding mode, and an ABS pressure intensifying mode is performed in response to the output of the control unit 12.

In the ABS pressure reducing mode, the electromagnetic inflow valve 3 is closed, while the electromagnetic outflow valve 4 is opened, and in addition the ABS pump 6 is driven by the motor M, thereby causing hydraulic fluid to flow out of the wheel cylinder to the reservoir 5. Thus, the wheel-cylinder pressure is gradually reduced and as a result the fluid pressure in the reflux line B reaches to the predetermined threshold value and gradually increases above the threshold, with the result that the plunger 20 is moved rightwards against the bias of the spring 21a at the aid of the increased fluid pressure introduced via the reflux port 17 into the pressure chamber 22. Accordingly, the wheel-cylinder side port 16 is communicated mainly through the orifice passage 19 with the master-cylinder side port 15, as shown in FIG. 1B. Under these conditions, the orifice passage 19 is directly communicated with the wheel-cylinder side port 16 through the circumferential groove 25, while the main fluid passage 18 is communicated with the wheel-cylinder side port 16 through the circumferential groove 24 and the annular orifice 26.

Subsequently to the above, when the control mode of the ABS is shifted from the pressure reducing mode to the pressure holding mode by shutting-off both of the valves 3 and 4, the pressurized fluid pressure created through the pump 6 tends to act on the outlet port of the master cylinder 1 through the control valve 13 and the first connecting line a. However, since the plunger 20 is still held in the rightmost position by the fluid pressure introduced through the reflux port 17 into the chamber 22, the fluid flow from the ABS pump 6 to the main fluid passage 18 is effectively constricted by the annular orifice 26 and the fluid flow from the pump 6 to the orifice passage 19 is blocked by the one-way check valve 27. This avoids undesirable feeling due to a kick-back of the brake-pedal 8.

Upon shifting from the pressure holding mode to the pressure intensifying mode by fully opening the valve 3 and remaining the valve 4 closed, the brake fluid is supplied again to the wheel cylinder 2 from the reflux line B. In addition, the brake fluid in the master cylinder 1 is also supplied through the control valve 13 to the wheel cylinder 2. In this case, the brake fluid from the master cylinder 1 is fed through two fluid paths, namely a fluid path defined by the common fluid passage 20a, the one-way check valve 27, the fixed orifice 28, the annular groove 25 and the wheel-cylinder side port 16 and a fluid path defined by the common fluid passage 20a, the main fluid passage 18, the annular groove 24, the annular orifice 26 and the wheel-cylinder side port 16. Thus, the brake fluid fed from the master cylinder side through the respective fluid paths to the wheel cylinder side is restricted through an orifice constriction, thereby assuring a suitable ABS moderate pressure intensifying characteristics. Such a moderate pressure intensifying characteristics can effectively attenuate noise due to a rapid change in the wheel-cylinder pressure. Thereafter, when the brakes are released, the brake fluid in the wheel cylinder 2 is quickly returned through the check valve 9 of the by-pass line C, the by-pass port 57, the main fluid passage 18, the chamber 21 and the port 15, to the master cylinder 1. Thus, the fluid pressure in each line A and C is smoothly reduced and consequently the fluid pressure in the reflux line B is relieved through the one-way check valve 60, with the result that the fluid pressure in the pressure chamber 22 becomes below the threshold value and thus the plunger 20 returns in the spring set position (the leftmost position as illustrated in FIG. 1A). Although the one-way check valve 60 is used to prevent back-flow from the supply line A to the reflux line B, the check valve may be replaced with an orifice assuring a designated restricted fluid flow. Furthermore, in the first embodiment, it is advantageous that the annular orifice 26 is provided instead of an expensive pressure accumulator usually arranged in the downstream end of the reflux line B for suppressing pulsating fluid flow created through the ABS pump 6.

As will be appreciated from the above, the ABS of the first embodiment is responsive to the fluid pressure in the reflux line B for switching a full fluid communication mode in which the control valve 13 establishes therethrough a full fluid communication between the brake-fluid supply line A and the outlet port of the master cylinder 1 such that the main fluid passage 18 is fully opened and the orifice passage 19 is fully closed, and a restricted fluid flow mode in which the control valve 13 establishes therethrough a restricted fluid flow from the master-cylinder side to the wheel-cylinder side that the main fluid passage 18 is fully closed and the orifice passage 19 is fully opened.

Second embodiment

Figure 4A:
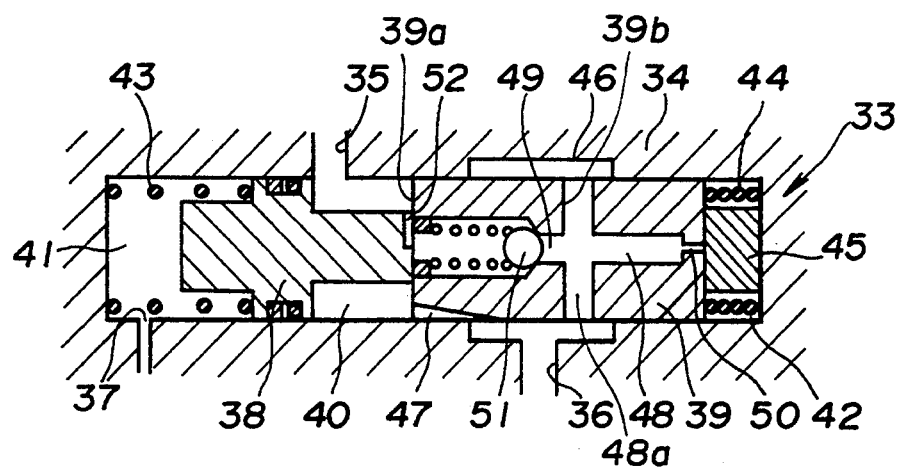
FIGS. 4A, 4B and 4C are a longitudinal cross-sectional view illustrating a control valve employed in a second embodiment of an anti-skid brake control system according to the invention.
Figure 4B:
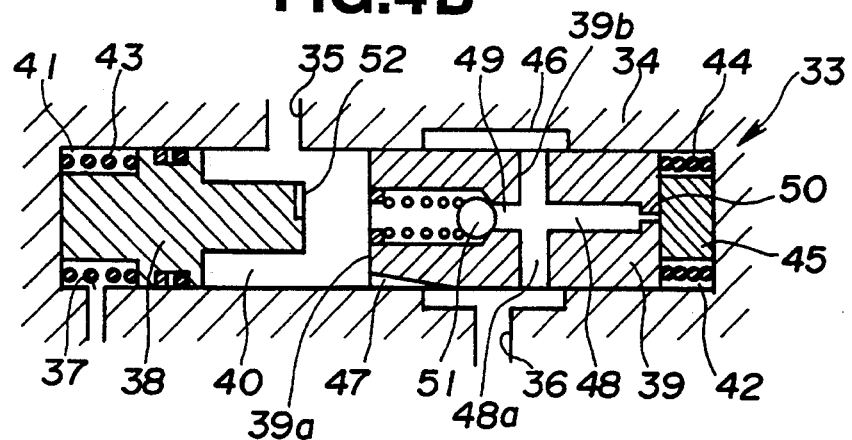
Figure 4C:
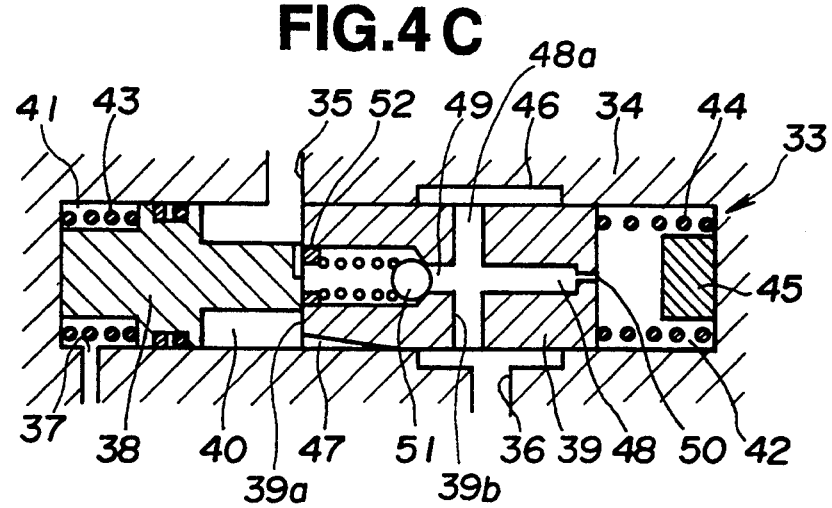
Figure 5:
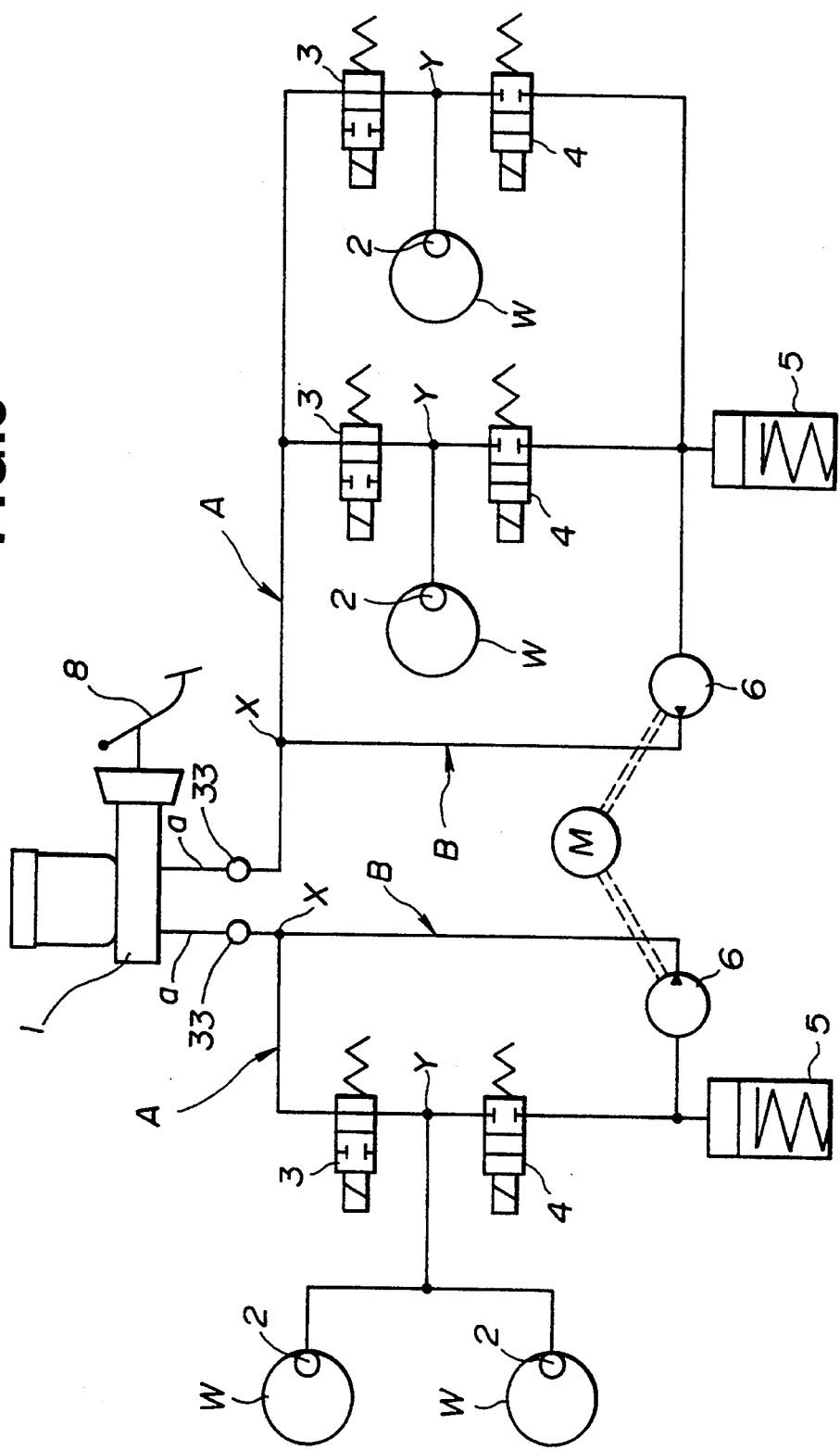
FIG. 5 is a circuit diagram illustrating a whole hydraulic brake circuit including the control valve of the second embodiment.

Referring now to FIGS. 4A, 4B, 4C and 5, there is shown the ABS of the second embodiment employing another plunger type control valve 33. The basic construction of the ABS of the second embodiment as shown in FIG. 5 is similar to that of the first embodiment as shown in FIGS. 2 and 3, except that the structure of the control valve 13 of the first embodiment is different from that of the control valve 33 of the second embodiment and the main brake-fluid line A serve as a brake-fluid release line as well as a brake-fluid supply line.

As shown in FIGS. 4A, 4B and 4C, the control valve 33 inlcudes a valve housing 34 defining an essentially cylindrical hollow therein, a master-cylinder side port 35 communicating with the first connecting line a, a wheel-cylinder side port 36 communicating with the main brake-fluid supply line A and an atmospheric air port 37 introducing atmosphere thereinto. Slidably enclosed in the cylindrical hollow of the housing 34 is a first plunger 38 and a second plunger 39. The first plunger 38 is disposed substantially between the two ports 35 and 37 to define a first pressure chamber 40 facing the right end surface thereof and an atmospheric air chamber 41 facing the left end surface thereof. On the other hand, the second plunger 39 is disposed substantially between the two ports 35 and 36 to define the first pressure chamber 41 in cooperation with the first plunger 38 and a second pressure chamber 42 facing the right end surface thereof. A return spring 43 is operably disposed in the atmospheric air chamber 41 to create the bias normally biasing the first plunger 38 in an axial rightward direction, while a return spring 44 is operably disposed in the second pressure chamber 42 to create the bias normally biasing the second plunger 39 in an axial leftward direction. The biasing force created by the spring 43 is preset to be greater than that of the spring 44, so that the first plunger 38 normally pushes the second plunger 39 in the rightward direction so as to hold the second plunger 39 in the rightmost position until the fluid pressure in the first pressure chamber 40 reaches a predetermined threshold value. In other words, the second plunger 39 is held in its rightmost position when the fluid pressure in the first pressure chamber 40 is equal to or lower than the threshold value. A stopper 45 is attached to the right end of the cylindrical hollow of the housing 34, so as to restrict a maximum axial rightward movement of the second plunger 39. An annular groove 46 is defined on the inner peripheral surface of the housing to assure a continuous fluid communication between the wheel-cylinder side port 36 and a radially extending fluid passage 48a defined in the second plunger 39. In addition to the fluid passage 48a, the second plunger 39 includes a first axial fluid passage 48 axially rightwardly extending from the radial fluid passage 48a, a second axial fluid passage 49 axially leftwardly extending from the radial fluid passage 48a. Furthermore, the second plunger 39 includes a tapered and notched fluid passage 47 on its left end, in order to suitably communicate between the first pressure chamber 40 and the wheel-cylinder side port 36 depending on a relative position of the second plunger 39 to the housing 34. Fluidly disposed in the first axial fluid passage 48 is a fixed orifice 50, so as to restrict a brake-fluid flow from the second fluid chamber 42 to the first fluid passage 48 through an orifice constriction. Fluidly disposed in the second axial fluid passage 49 is an one-way check valve 51 permitting only the brake-fluid flow from the wheel-cylinder side port 36 through the annular groove 46 to the first pressure chamber 40. A notched fluid passage 52 is also defined on the right end of the first plunger 38 in such a manner as to communicate the first pressure chamber 40 with the second axial fluid passage 49 via the check valve 51 even under a particular condition wherein the right end of the first plunger 38 and the left end of the second plunger 39 abut to each other. Reference numeral 39a designates a pressure receiving surface defined on the left end of the second plunger 39, while reference numeral 39b designates a substantially midway pressure receiving surface provided for receiving the fluid pressure introduced into the radial fluid passage 48a of the second plunger 39. With the above-noted arrangement, the ABS of the second embodiment, operates as follows.

(1) Usual braking:

Under a condition in which the brake pedal 8 is not depressed, the master-cylinder pressure corresponds to substantially zero and as a result no pressure is applied to the first pressure chamber 40. As shown in FIG. 4A, the first plunger 38 is thus pressed in the rightward direction by means of the spring 43, and as a result the second plunger 39 is also held in the rightmost position. Under this condition as illustrated in FIG. 4A, the first pressure chamber 40 is communicated through the notched fluid passage 47 with the annular groove 46 and in addition a fluid communication between the first axial fluid passage 48 and the second pressure chamber 42 is blocked because the orifice 50 is held closed through the abutment between the right end of the second plunger 39 and the stopper 45. Such a fully closed state of the orifice 50 will be hereinafter referred to as an "orifice inoperative state". Thereafter, when the brake pedal 8 is depressed, the master-cylinder pressure is introduced through the first connecting line a and the port 35 into the first pressure chamber 40, with the result that the incoming fluid pressure introduced through the port 35 acts on the right pressure receiving surface of the first plunger 38 to move it leftwards against the biasing force of the spring 43. As the master-cylinder pressure is introduced into the first pressure chamber 40, the first plunger 38 moves leftwards and is held in the leftmost position as shown in FIG. 4B. At this time, that is, at the beginning of usual braking, since the incoming fluid pressure introduced through the master-cylinder side port 35 is greater than the fluid pressure at the junction X (corresponding to the fluid pressure introduced through the wheel-cylinder side port into the radial fluid passage 48a), the second plunger 39 is held in the rightmost position. In the above position relationship between the first and second plungers, the brake-fluid of the master-cylinder side is fed from the first pressure chamber 40 through the notched fluid passage 47, the annular groove 46, the wheel-cylinder side port 36 and the fluid supply line A to the wheel cylinder 2, in that order.

At the end of braking, when a few minutes have elapsed after depressing the brake pedal, since the wheel-cylinder pressure reaches the master-cylinder pressure, the pressure difference between the fluid pressure in the master-cylinder side port 35 and the fluid pressure in the wheel-cylinder side port 36 becomes substantially zero. That is, the rightward pushing force created by the pressure acting on the pressure receiving surface 39a is balanced to the leftward pushing force created by the pressure acting on the pressure receiving surface 39b, with the result that, as shown in FIG. 4C, the second plunger 39 is moved leftwards by the bias of the spring 44 until the left end surface of the second plunger 39 abuts the right end of the first plunger 38 remained in the leftmost position. As seen in FIG. 4C, blocked is the fluid communication between the first pressure chamber 40 and the annular groove 46, with the fully closed notched fluid passage 47. Under such a condition, when the brake pedal is returned in its spring set position, the master-cylinder pressure is rapidly reduced and as a result the fluid pressure in the wheel-cylinder side port 36 becomes rapidly greater than that in the master-cylinder side port 35. Thus, the brake fluid in the wheel cylinder 2 is returned from the main brake-fluid line A serving as the fluid pressure release line through the annular groove 46, the radial fluid passage 48a, the second axial fluid passage 49, the check valve 51, the notched fluid passage 52, the first pressure chamber 40 and the master-cylinder side port 35, into the master cylinder 1. In this manner, the wheel-cylinder pressure is gradually reduced.

(2) Anti-skid control:

In the ABS pressure reducing mode and the ABS pressure holding mode, as the fluid supply and release line A is fully closed by means of the electromagnetic valve 3, the incoming fluid pressure introduced into the control valve 33 is balanced to the outgoing fluid pressure from the valve 33. Additionally, when the ABS operates at the pressure reducing mode or the pressure holding mode, the pressure level in the master-cylinder side port 35 has developed greater to such a degree that the pressure acting on the right end of the first plunger 38 moves the first plunger 38 in the axial leftward direction against the bias of the spring 43. Under these conditions, the incoming fluid pressure introduced through the master-cylinder side port 35 into the first pressure chamber 40 exceeds a predetermined threshold value, with the result that the first and second plungers 38 and 39 are both kept in their leftmost positions as illustrated in FIG. 4C. In the above described position relationship of the two plungers 38 and 39 relative to the housing 34, the orifice 50 is held in its fully open state, to establish a fluid communication between the second pressure chamber 42 and the first axial fluid passage 48. Such a fully open state of the orifice 50 will be hereinafter referred to as an "orifice operative state". Thereafter, when the operational mode of the ABS is shifted from the pressure reducing mode or pressure holding mode to the pressure intensifying mode in accordance with the instruction of the control unit, the electromagnetic inflow valve 3 is fully opened, while the electromagnetic outflow valve 4 is fully closed. At this time, the brake fluids in the lines A and B are introduced through the fully opened valve 3 into the wheel cylinder 2. Due to the fluid flow towards the wheel cylinder 2 from the junction X, the fluid pressure in the wheel-cylinder side port 36 is slightly reduced to a lower level than that in the master-cylinder side port 35, with an increased depression of the brake pedal 8. As the above-noted pressure difference between the master-cylinder side and the wheel-cylinder side is gradually increased, the second plunger 39 moves rightwards and is kept in the rightmost position as shown in FIG. 4B against the bias of the spring 44. That is, at the beginning of shifting of the second plunger 39 from the leftmost position illustrated in FIG. 4C to the right most position illustrated in FIG. 4B, a fluid communication between the first pressure chamber 40 and the annular groove 46 is still blocked off. Additionally, the fluid flow from the master-cylinder side port 35 through the check valve 51, the second axial fluid passage 49 and the radial fluid passage 48a to the wheel-cylinder side port 36 is blocked by means of the check valve 51. Alternatively, permitted is only the fluid flow pushed out of the second pressure chamber 42 through the orifice 50 defined at the right end surface of the second plunger 39. Thus, the wheel-cylinder pressure is moderately increased in accordance with the restricted fluid flow of the brake fluid pushed out of the second pressure chamber 42 in the ABS pressure intensifying mode, i.e., during transit from the leftmost position of the plunger 39 as shown in FIG. 4C to the rightmost position as shown in FIG. 4B. Consequently, upon the pressure difference between the master-cylinder side and the wheel-cylinder side reaches to substantially zero, the second plunger 39 returns in the leftmost position as shown in FIG. 4C. As set forth above, the ABS moderate pressure intensifying characteristics is assured. The control valve 33 employed in the second embodiment is characterized in that the first and second plungers 38 and 39 are both kept in their leftmost positions as shown in FIG. 4C, when the fluid pressure in the master-cylinder side port 35 is balanced to the fluid pressure in the wheel-cylinder side port 36 and in addition the fluid pressure in the master-cylinder side port exceeds a predetermined threshold value.

As will be appreciated from the explanation of the second embodiment, since the ABS moderate pressure intensifying characteristics is obtained through an orifice constriction of the orifice 50 at only the ABS pressure intensifying mode, the ABS of the second embodiment can provide a desired moderate pressure intensifying characteristics during operation of the ABS and a high braking response during usual braking.

Third embodiment

Figure 6A:
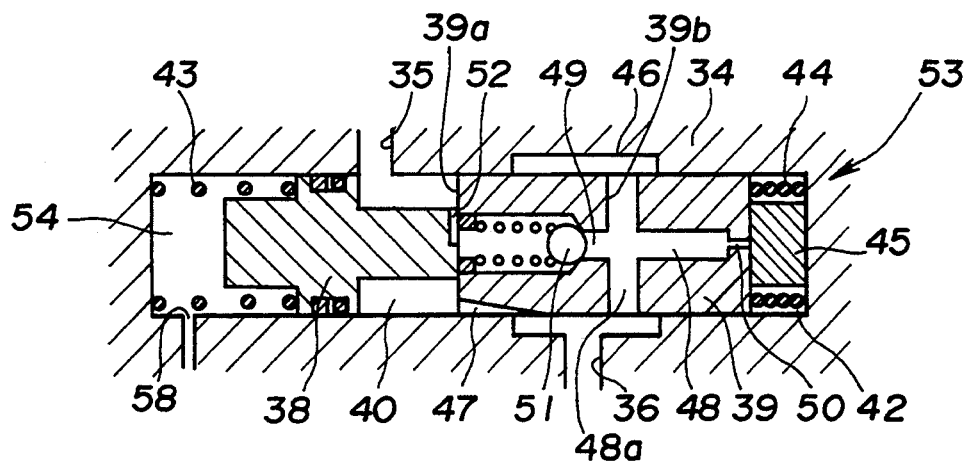
FIGS. 6A, 6B and 6C are a longitudinal cross-sectional view illustrating a control valve employed in a third embodiment of an anti-skid brake control system.
Figure 6B:
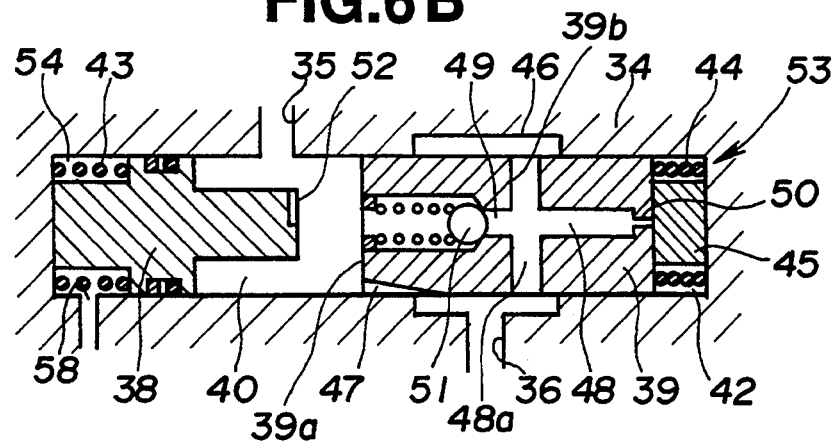
Figure 6C:
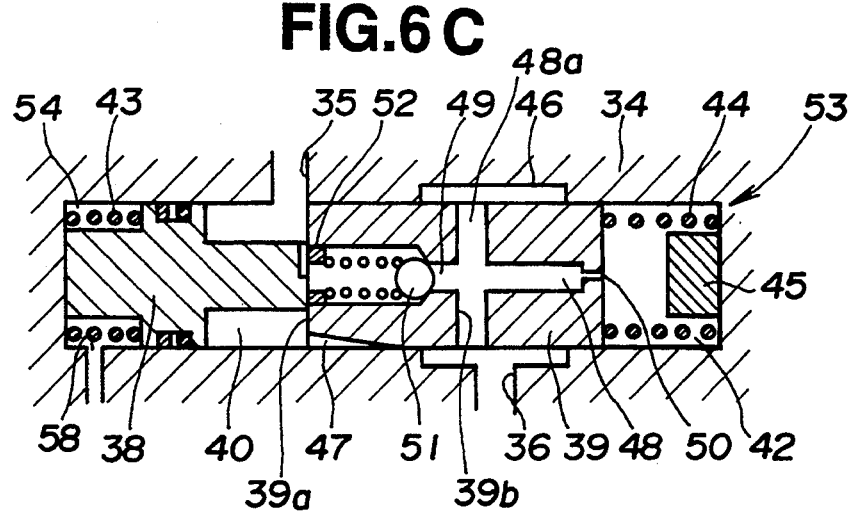
Figure 7:
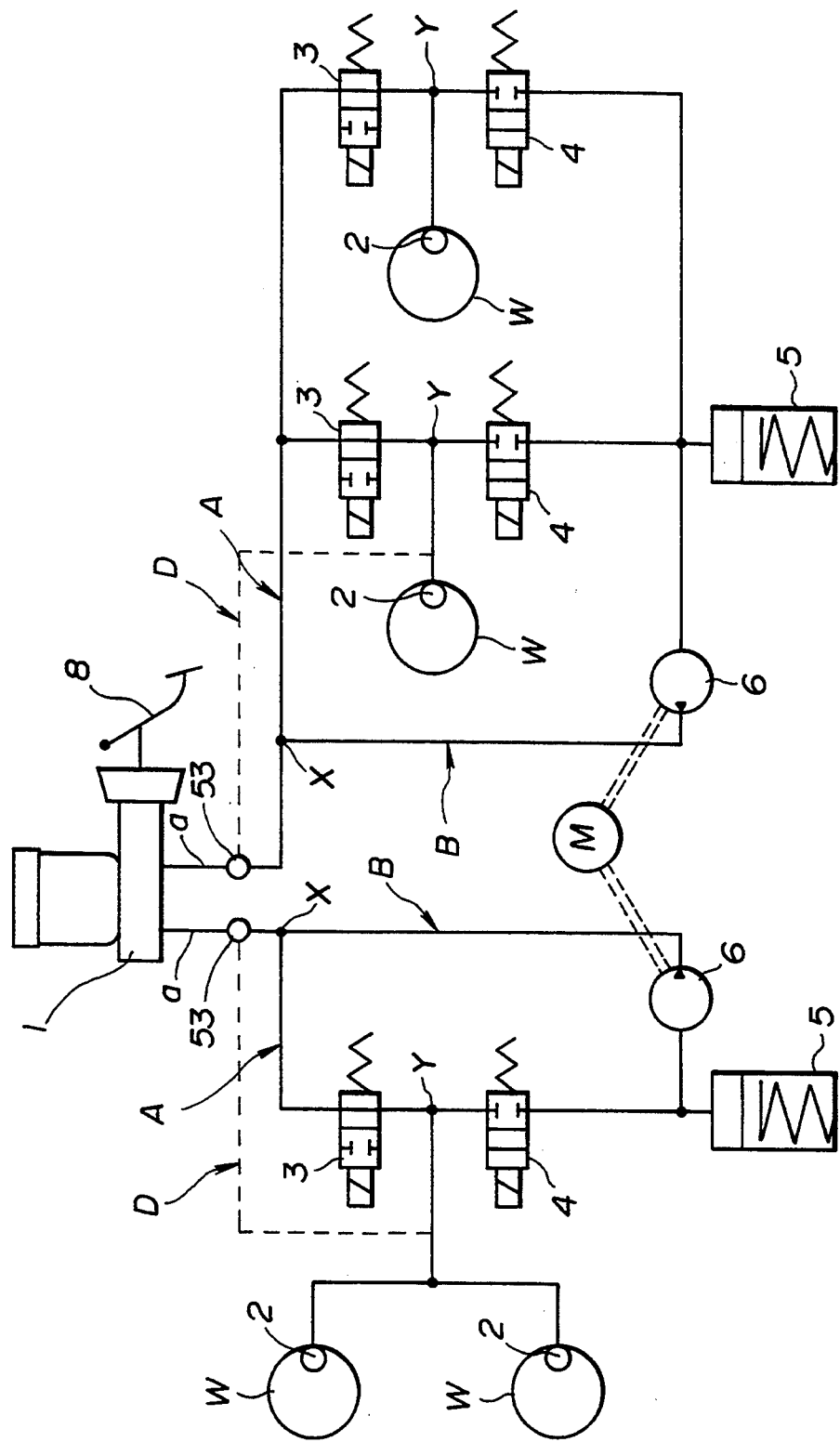
FIG. 7 is a circuit diagram illustrating a whole hydraulic brake circuit including the control valve employed in the third embodiment.
Figure 8:
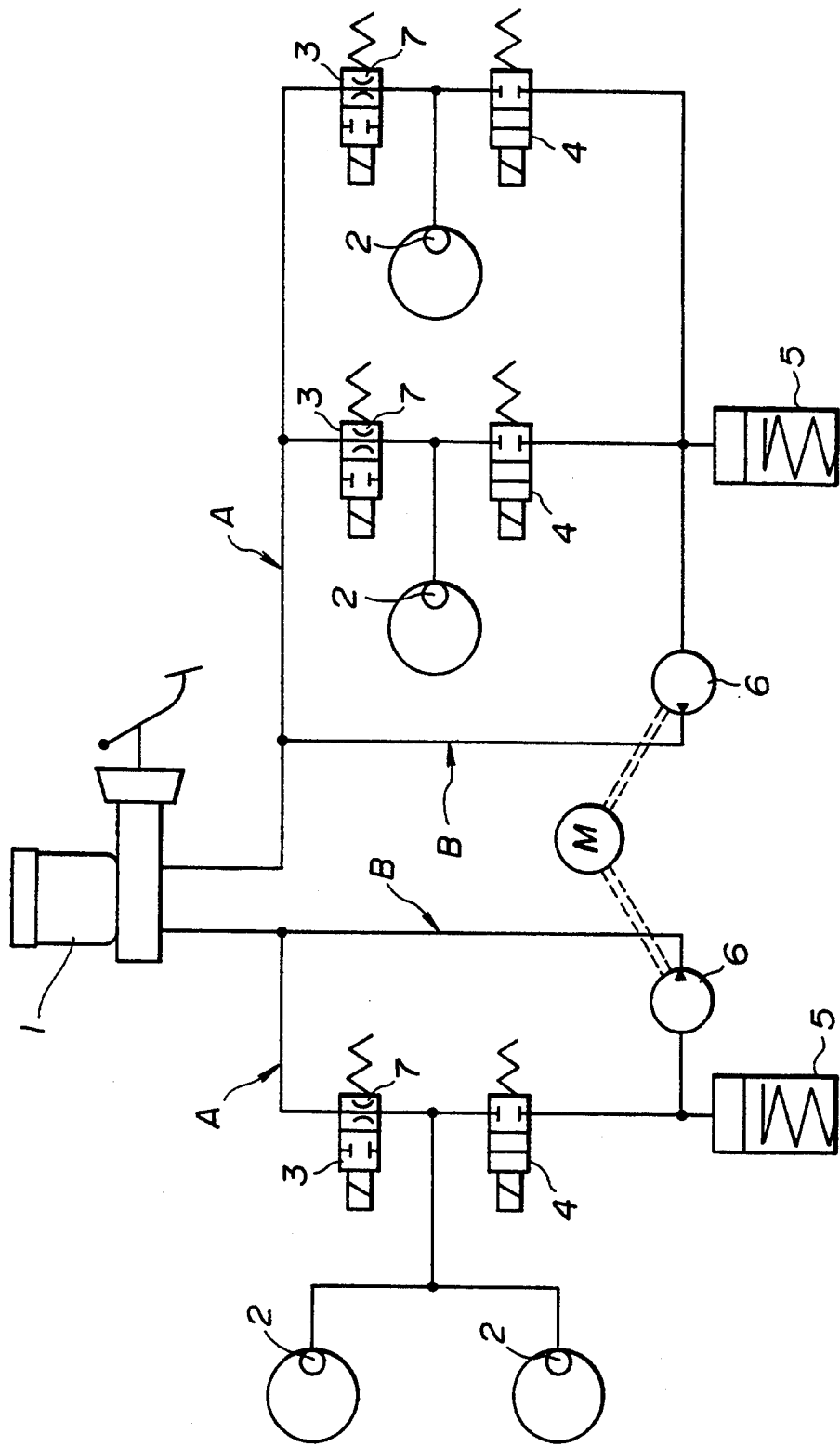
FIG. 8 is a circuit diagram illustrating a whole hydraulic brake circuit of a conventional anti-skid brake control system.

Referring now to FIGS. 6A, 6B, 6C and 7, there is shown the ABS of the third embodiment employing a still further type control valve 53. The basic construction of the ABS of the third embodiment as shown in FIG. 7 is similar to that of the second embodiment as shown in FIG. 5, except that the atmospheric air port 37 is replaced with a pilot port 58 leading to the inlet port of the wheel cylinder 2 and the atmospheric air chamber 41 is replaced with a third pressure chamber 54 arranged for introducing therein a wheel-cylinder side brake-fluid pressure as a pilot pressure for the first plunger 38. In FIG. 7, the broken line D designates a pilot line supplying the wheel-cylinder pressure through the pilot port 58 into the third pressure chamber 54. The control valve 53 employed in the ABS of the third embodiment is characterized in that the first and second plungers 38 and 39 are both kept in their leftmost positions as shown in FIG. 6C, when the fluid pressure in the master-cylinder side port 35 is balanced to the fluid pressure in the wheel-cylinder side port 36 and in addition the pressure difference between the master-cylinder pressure introduced into the master-cylinder side port and the wheel-cylinder pressure introduced into the third pressure chamber 54 exceeds a predetermined threshold value. The ABS of the third embodiment operates as follows.

(1) Usual braking:

Under a condition in which the brake pedal 8 is not depressed, the master-cylinder pressure is zero and thus no pressure is applied to the first pressure chamber 40. Therefor, the first and second plungers 38 and 39 are both held in their rightmost positions by the bias of the spring 43, as shown in FIG. 6A. The first pressure chamber 40 is communicated through the notched fluid passage 47 with the annular groove 46 and a fluid communication between the first axial fluid passage 48 and the second pressure chamber 42 is blocked by means of the fully closed orifice 50. Thereafter, when the brake pedal 8 is depressed, the fluid pressure in the master-cylinder side port 35 becomes greater than that in the wheel-cylinder side port 36 and in addition the master-cylinder pressure becomes greater than the wheel-cylinder pressure. At such the beginning of usual braking, the first plunger 38 moves leftwards against the bias of the spring 43 and is held in its leftmost position as shown in FIG. 6B, since the pressure difference between the incoming fluid pressure introduced through the master-cylinder side port 35 into the first pressure chamber 40 and the pilot pressure introduced through the pilot port 58 into the third pressure chamber 54, exceeds a predetermined threshold value. Therefore, the incoming brake fluid is fed from the first pressure chamber 40 through the notched fluid passage 47, the annular groove 46, the wheel-cylinder side port 36 and the main brake-fluid line A into the wheel cylinder 2. At the end of braking, due to the substantially same wheel-cylinder pressure as the master-cylinder pressure, the pressure difference between the fluid pressure in the master-cylinder side port 35 and the pilot pressure in the pilot port 58 becomes substantially zero, with the result that the first plunger 38 returns in the spring set position as shown in FIG. 6A. Under such a condition, when the brakes are released, due to a rapidly reduced master-cylinder pressure, the brake fluid in the wheel cylinder 2 is quickly returned from the main brake-fluid line A through both the notched fluid passage 47 and the second axial fluid passage 49 via the annular groove 46 into the master cylinder 1. During usual braking, the orifice 50 is kept in its orifice inoperative state as shown in FIGS. 6A and 6B.

(2) Anti-skid control:

In the ABS pressure reducing mode, the main brake-fluid line A is fully closed by means of the inflow valve 3 and the reflux line B is fully opened by means of the outflow valve 4. As a result, the wheel-cylinder pressure is quickly reduced and thus the pressure difference between the fluid pressure in the master-cylinder side port 35 and the pilot pressure in the third pressure chamber 54 exceeds the predetermined threshold value. Consequently, the first plunger 38 moves leftwards against the bias of the spring 43 and is held in the leftmost position, as shown in FIG. 6C. Due to the fully closed valve 3, the fluid pressure in the master-cylinder side port 35 is balanced to the fluid pressure in the wheel-cylinder side port 36 or the fluid pressure at the junction X, with the result that the second plunger 39 also moves in its leftmost position by the bias of the spring 44, as seen in FIG. 6C. Under this condition, a fluid communication between the first pressure chamber 40 and the annular groove 46 is blocked and the orifice 50 is in its operative state. Subsequently, when the operational mode of the ABS is shifted from the pressure reducing mode to the pressure intensifying mode, the inflow valve 3 is fully opened again and the outflow valve 4 is kept in its fully closed state. The brake fluid in the lines A and B are introduced through the inflow valve 3 into the wheel cylinder 2. In accordance with the fluid flow towards the wheel cylinder 2, the fluid pressure in the wheel-cylinder side port 36 is reduced to a lower level than that in the master-cylinder side port 35 with the result of increased depressing amount of the brake pedal 8. As the pressure difference between the master-cylinder side and the wheel-cylinder side is gradually increased, the second plunger 39 moves rightwards and is kept in the rightmost position as shown in FIG. 6B against the bias of the spring 44. In accordance with the axially rightward movement of the second plunger 39, the brake fluid in the second pressure chamber 42 is pushed out through the orifice 50 being in its operative state. The brake fluid flowing out of the second pressure chamber 42 is fluidly restricted through an orifice constriction of the orifice 50. As a result, the wheel-cylinder pressure is moderately increased in the ABS pressure intensifying mode. Thereafter, upon the pressure difference between the master-cylinder side and the wheel-cylinder side reaches to substantially zero, the second plunger 39 returns in the leftmost position as shown in FIG. 6C. As set forth above, the control valve 53 of the third embodiment assures the ABS moderate pressure intensifying characteristics. The control valve 53 employed in the third embodiment is characterized in that the first and second plungers 38 and 39 are both kept in their leftmost positions as shown in FIG. 6C, when the fluid pressure in the master-cylinder side port 35 is balanced to the fluid pressure in the wheel-cylinder side port 36 and in addition the pressure difference between the master-cylinder pressure and the wheel-cylinder pressure exceeds a predetermined threshold value.

As will be appreciated from the above, in the third embodiment, the ABS moderate pressure intensifying characteristics is obtained through an orifice constriction of the orifice 50 at only the ABS pressure intensifying mode, the ABS of the third embodiment can provide a desired moderate pressure intensifying characteristics during operation of the ABS. Moreover, since the brake fluid is fed from the master cylinder 1 to the wheel cylinder 2 through the third pressure chamber 54 via the pilot port 58 as well as through the main brake-fluid line A during usual braking, the control valve of the ABS of the third embodiment can assure a more superior braking response during braking, when compared with the system of the second embodiment.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. An anti-skid brake control system for an automotive vehicle, comprising:
   a main brake-fluid line fluidly disposed between a master cylinder and a wheel cylinder, for supplying a brake fluid from the master cylinder to the wheel cylinder during usual braking;
   a brake-fluid reflux line arranged in parallel with said main brake-fluid line, for returning the brake fluid in the wheel cylinder to the master cylinder side during operation of the system;
   a directional control valve means arranged for directionally controlling a fluid flow in said main brake-fluid line and a fluid flow in said reflux line depending upon a skidding condition of a vehicle wheel;
   a fluid-pressure operated fluid flow control means arranged between the outlet port of the master cylinder and an upstream junction of said main brake-fluid line and said reflux line; and
   said fluid flow control means including a fluid flow constricting means responsive to the master-cylinder pressure above a predetermined threshold value to provide a constricted fluid flow to the wheel cylinder therethrough when the master-cylinder pressure becomes slightly greater than the fluid pressure in said upstream junction from a balanced state wherein the master-cylinder pressure and the fluid pressure in said upstream junction are balanced to each other, and a constricted fluid-flow releasing means responsive to the master-cylinder pressure below said predetermined threshold value for keeping said fluid flow constricting means in an inoperative state and for establishing a full fluid communication between the master cylinder and the wheel cylinder.

2. An anti-skid brake control system for an automotive vehicle, comprising:
   a main brake-fluid line fluidly disposed between a master cylinder and a wheel cylinder, for supplying a brake fluid from the master cylinder to the wheel cylinder, during usual braking;
   a brake-fluid reflux line arranged in parallel with said main brake-fluid line, for returning the brake fluid in the wheel cylinder to the master cylinder side, during operation of the system;

a directional control valve means arranged for directionally controlling a fluid flow in said main brake-fluid line and a fluid flow in said brake-fluid reflux line, depending upon a skidding condition of a vehicle wheel;

a fluid-pressure operated fluid flow control means arranged between the outlet port of the master cylinder and an upstream junction of said main brake-fluid line and said reflux line;

wherein said fluid flow control means including a fluid flow constricting means responsive to the master-cylinder pressure above a predetermined threshold value to provide a constricted fluid flow to the wheel cylinder therethrough when the master-cylinder pressure becomes slightly greater than the fluid pressure in the upstream junction from a balanced state wherein the master-cylinder pressure and the fluid pressure in the upstream junction are balanced to each other, and a constricted fluid-flow releasing means responsive to the master-cylinder pressure below said predetermined threshold value for keeping said fluid flow constricting means in an inoperative state and for establishing a full fluid communication between the master cylinder and the wheel cylinder, and wherein said fluid flow control means comprises a plunger valve having a valve housing, a first plunger defining a first pressure chamber leading to the master cylinder and an atmospheric air chamber introducing atmosphere thereinto and a second plunger defining a second pressure chamber storing a brake fluid, said constricted fluid-flow releasing means includes said first plunger responsive to the master-cylinder pressure and a first return spring acting to hold said first plunger in a spring-set position by a bias of said first return spring when the master-cylinder pressure is equal to or lower than the predetermined threshold value, and said fluid flow constricting means includes said second plunger responsive to the pressure difference between the master-cylinder pressure and the fluid pressure in said upstream junction, a second return spring acting to hold said second plunger in a spring set position by a bias of said second return spring when the master-cylinder pressure is balanced to the fluid pressure in said upstream junction, and a fixed orifice formed in said second plunger for assuring a constricted brake-fluid flow out of said second pressure chamber during operation of the system.

* * * * *